(12) United States Patent
Zubot et al.

(10) Patent No.: US 9,890,060 B2
(45) Date of Patent: Feb. 13, 2018

(54) METHOD OF TREATING WATER USING PETROLEUM COKE AND A PH-LOWERING AGENT

(71) Applicant: SYNCRUDE CANADA LTD. in trust for the owners of the Syncrude Project, as such owners exist now and Fort McMuray, Fort McMurray (CA)

(72) Inventors: Warren Zubot, Edmonton (CA); Gail Buchanan, Fort McMurray (CA)

(73) Assignee: SYNCRUD CANADA LTD., Fort McMurrary (CA), in trust for the owners of the Syncrude Project as such owners exist now and in the future ( * ) Notice: Subject to any disclaimer, the term of this patent is extended or adjusted under 35 U.S.C. 154(b) by 0 days.

(21) Appl. No.: 14/535,026

(22) Filed: Nov. 6, 2014

(65) Prior Publication Data

US 2015/0122732 A1  May 7, 2015

Related U.S. Application Data

(60) Provisional application No. 61/901,299, filed on Nov. 7, 2013.

(51) Int. Cl.
*C02F 1/28* (2006.01)
*B01D 15/00* (2006.01)
(Continued)

(52) U.S. Cl.
CPC .............. *C02F 1/283* (2013.01); *C02F 1/66* (2013.01); *C02F 1/441* (2013.01); *C02F 1/444* (2013.01);
(Continued)

(58) Field of Classification Search
CPC .......... C02F 1/281; C02F 1/001; C02F 1/283; C02F 9/00; C02F 1/28; C02F 1/66;
(Continued)

(56) References Cited

U.S. PATENT DOCUMENTS 4,113,615 A * 9/1978 Gorbaty .................. C02F 1/283
  210/694
4,292,176 A * 9/1981 Grutsch .................. B01J 20/20
  210/616

(Continued)

FOREIGN PATENT DOCUMENTS

CA         2607353        4/2009

OTHER PUBLICATIONS

Brient, J.A., et al. Naphthenic Acids. Encyclopedia of Chemical Technology, 4th Ed. 1995. pp. 1017-1029. vol. 16. John Wiley & Sons. New York.
(Continued)

*Primary Examiner* — Ana Fortuna
(74) *Attorney, Agent, or Firm* — Bennett Jones LLP

(57) ABSTRACT

A process for treating water containing dissolved organic compounds, including naphthenic acids, for example, oil sands process water, using petroleum coke is provided, comprising: removing petroleum coke from a coking operation; forming a petroleum coke/water slurry by adding the water containing dissolved organic compounds to the petroleum coke; adding a pH-lowering agent to the petroleum coke/water slurry either during slurry formation or after slurry formation to form a treated petroleum coke/water slurry; and allowing the treated petroleum coke/water slurry to mix for a sufficient time in a carbon adsorption reactor to allow the petroleum coke to adsorb a substantial portion of the dissolved organic compounds from the water.

30 Claims, 4 Drawing Sheets

(51) Int. Cl.
*B01D 61/00* (2006.01)
*C02F 1/44* (2006.01)
*C02F 1/66* (2006.01)
C02F 1/72 (2006.01)
C02F 3/12 (2006.01)
C02F 101/32 (2006.01)
C02F 103/10 (2006.01)
C02F 103/36 (2006.01)

(52) U.S. Cl.
CPC .................................. C02F 1/72 (2013.01); C02F 3/12 (2013.01); C02F 2101/32 (2013.01); C02F 2103/10 (2013.01); C02F 2103/365 (2013.01); Y02W 10/15 (2015.05)

(58) Field of Classification Search
CPC ........ C02F 1/681; C02F 2209/06; C02F 1/05; B01D 15/00; B01D 2311/2626; B01D 61/145; B01D 61/02
See application file for complete search history.

(56) References Cited

U.S. PATENT DOCUMENTS

| | | | | |
|---|---|---|---|---|
| 4,734,205 | A * | 3/1988 | Jacques | C02F 1/54 |
| | | | | 210/708 |
| 5,783,084 | A * | 7/1998 | Suenkonis | B01D 1/12 |
| | | | | 159/47.3 |
| 6,027,649 | A * | 2/2000 | Benedek | B01D 61/16 |
| | | | | 210/321.78 |
| 6,932,956 | B2 * | 8/2005 | Jia | B01D 53/04 |
| | | | | 423/244.01 |
| 7,638,057 | B2 | 12/2009 | Zubot et al. | |
| 2003/0127226 | A1 * | 7/2003 | Heins | C02F 1/04 |
| | | | | 166/303 |
| 2005/0087495 | A1 * | 4/2005 | Parke | C02F 1/283 |
| | | | | 210/688 |
| 2005/0236335 | A1 * | 10/2005 | Karaman | C02F 1/28 |
| | | | | 210/665 |
| 2007/0102359 | A1 * | 5/2007 | Lombardi | B01D 17/085 |
| | | | | 210/639 |
| 2007/0119779 | A1 * | 5/2007 | Muramoto | B01D 61/02 |
| | | | | 210/639 |
| 2007/0199867 | A1 * | 8/2007 | Zhang | C02F 1/283 |
| | | | | 210/103 |
| 2008/0029456 | A1 * | 2/2008 | Dueker | B01D 61/022 |
| | | | | 210/641 |
| 2012/0029232 | A1 * | 2/2012 | Kuramitsu | B01J 20/20 |
| | | | | 562/580 |
| 2013/0233771 | A1 * | 9/2013 | Betzer-Zilevitch | C10G 1/047 |
| | | | | 208/390 |
| 2013/0299426 | A1 * | 11/2013 | McLeod | B01D 61/145 |
| | | | | 210/639 |
| 2014/0047975 | A1 * | 2/2014 | Mazumdar | C02F 1/66 |
| | | | | 95/1 |
| 2015/0122732 | A1 * | 5/2015 | Zubot | C02F 1/66 |
| | | | | 210/620 |

OTHER PUBLICATIONS

Scott, A.C., et al. Naphthenic Acids in Athabasca Oil Sands Tailings Waters are less Biodegradable Than Commercial Naphthenic Acids. ES&T. 2005. pp. 8288-8394. vol. 39.
Chung, K.H., et al. Leachability of Cokes from Syncrude Stockpiles. ES&T. 1996. pp. 50-53. vol. 3.
Alberta Environment Protection. Naphthenic Acids Background Information Discussion Report. 1996. Alberta Environment, Environmental Assessment Division.
Zubot, W. et al. Petroleum Coke Adsorption as a Water Management Option for Oil Sands Process-Affected Water. 2012. Science of the Total Environment. pp. 364-372. vol. 427.

* cited by examiner

METHOD OF TREATING WATER USING PETROLEUM COKE AND A PH-LOWERING AGENT

FIELD OF THE INVENTION

The present invention relates to an improved method of treating water containing dissolved organic compounds using petroleum coke and a pH-lowering agent. More particularly, water produced during mineral extraction such as the recovery of bitumen from oil sands can be treated with petroleum coke produced in coking reactions and a pH-lowering agent such as an acid or carbon dioxide in order to remove dissolved organic compounds (organics) therein, for example, naphthenic acids and hydrocarbons.

BACKGROUND OF THE INVENTION

The demands for water in many mineral extraction processes are high and therefore most operations must rely on recycling water used therein ("process water"). However, for example, during oil sands processing to extract bitumen, a significant amount of dissolved inorganic (e.g., salts) and organic (e.g., carboxylic acids, hydrocarbon, naphthenic acids) constituents are released into process waters. Recycling of oil sands process water (OSPW) only serves to increase the concentrations of dissolved inorganic and organic material. Currently no OSPW is released from these oil sands operations to the environment.

In order to ensure process water such as OSPW is not acutely toxic prior to release, it is necessary to treat the OSPW to reduce the dissolved organics, such as naphthenic acids and other hydrocarbons. Naphthenic acids have been demonstrated to be toxic to aquatic biota (Alberta Environment Protection. 1996. Naphthenic acids background information discussion report. Edmonton, Alberta, Alberta Environment, Environmental Assessment Division). Thus, the concentration of naphthenic acids present in OSPW must be reduced to levels that are not detrimental to the biological community of a receiving aquatic system. Removal of naphthenic acids may be accomplished with either natural bioremediation or treatment methods to remove them from the OSPW.

Naphthenic acids (NAs) are natural constituents in many petroleum sources, including bitumen in the oil sands of Northern Alberta, Canada. NAs are complex mixtures of predominately low molecular weight (<500 amu), fully saturated alkyl-substituted acyclic and cycloaliphatic (one to more than six rings) carboxylic acids (Brient, J. A., Wessner, P. J., and Doyle, M. N. 1995. Naphthenic acids. In Encyclopedia of Chemical Technology, 4th ed.; Kroschwitz, J. I., Ed.; John Wiley & Sons: New York, 1995; Vol. 16, pp 1017-1029). They are described by the general empirical formula $C_nH_{2n+Z}O_2$, where n indicates the carbon number and Z is zero or a negative, even integer that specifies the hydrogen deficiency resulting from ring formation (i.e. Z=−2 indicates 1-ring, Z=−4, 2-rings etc.). While some of naphthenic acids will biodegrade rapidly, a fraction of the naphthenic acids associated with the OSPW have been shown to be more recalcitrant (Scott, A. C., M. D. MacKinnon, and P. M. Fedorak. 2005. Naphthenic acids in Athabasca oil sands tailings waters are less biodegradable than commercial naphthenic acids. *ES&T* 39: 8388-8394). To facilitate aquatic reclamation activities, it is desirable to find options for more rapid removal of NAs from OSPW that is effective, targeted to the dissolved organics and economically viable.

In oil sands surface mining operations for recovery of bitumen, also referred to as open-pit oil sands operations, hot or warm water, to which a process aid, such as caustic (NaOH) may be added, is mixed with the oil sand ore (about 1.5-2 $m^3$ of water per barrel of oil extracted) in order to separate the bitumen from the oil sand. The resulting oil sand slurry goes through a series of separators to produce lean bitumen froth. The tailings stream produced during bitumen extraction, which comprises water, sand and un-recovered bitumen, is transported to settling basins, where the solids settle by gravity, and the resulting "free" or "surface" water (OSPW) is recycled for reuse in the extraction process. Also included as recycle or "free" water is seepage water from sand structures containing settling basins. It is during this extraction process that leaching of both inorganic and organic constituents will occur. Bitumen in deposits too deep to be economically recoverable by surface mining can also be recovered from oil sands in situ (in the geological formation) using the Steam Assisted Gravity Drainage process (the "SAGD" process). SAGD requires the generation of large amounts of steam in steam generators, with the steam injected via injection wells to fluidize the bitumen for recovery. A bitumen/water mixture results and the mixture is pumped to the surface where the bitumen is separated from the water. The produced water stream (i.e., oil sands process water) is then reused to produce more steam for extraction. As in surface mining operations, the produced water stream contains dissolved organics that need to be removed. The produced water in SAGD must be treated to meet requirements for once-through steam generators and the retentate from this preparation will contain elevated NAs and other dissolved organic compounds.

Bitumen produced from either surface mining operations or SAGD can be further upgraded by thermal cracking using coking reactions, as are known in the art, to take the highly viscous bitumen (API gravity of about 8°) to a less viscous hydrocarbon product (API gravity of about 30°). During coking reactions, an excess amount of petroleum coke is produced, which excess coke is currently stored for future uses such as reclamation substrates or energy sources. Therefore, petroleum coke produced from coking operations is a readily available commodity.

There is a need for an effective, selective and economical water treatment process for the OSPW produced during bitumen extraction processes and upgrading processes so that the water can be reused in the operation or returned to a receiving environment.

The present applicant made the previous surprising discovery that petroleum coke can be used to treat process water from oil sands operations to remove a substantial portion of dissolved organics without having to explicitly activate the petroleum coke. The use of petroleum coke was particularly effective in treating oil sands process water (OSPW) produced during surface oil sands mining operations, and, particularly, when fresh product coke (FPC) produced during fluid coking operations was used. Canadian Patent No. 2,607,353 describes the process of using petroleum coke to treat process water from oil sands operations.

SUMMARY OF THE INVENTION

The present invention is based on the surprising discovery that the removal of dissolved organics present in process water such as oil sands process water (OSPW) produced during surface oil sands mining operations with petroleum coke could be improved by the addition of a pH-lowering agent to a water/petroleum coke slurry. The present invention is particularly effective when fresh product coke (FPC) produced during fluid coking operations is used.

In one broad aspect of the invention, a process for treating water containing dissolved organic compounds is provided, comprising:
  removing petroleum coke from a coking operation;
  forming a petroleum coke/water slurry by adding the water containing dissolved organic compounds to the petroleum coke;
  adding a pH-lowering agent to the petroleum coke/water slurry either during slurry formation or after slurry formation to form a treated petroleum coke/water slurry having a reduced pH; and
  allowing the treated petroleum coke/water slurry having a reduced pH to mix for a sufficient time in a carbon adsorption reactor to allow the petroleum coke to adsorb a substantial portion of the dissolved organic compounds from the water.

The water containing dissolved organic compounds can be oil sands process water generated during bitumen extraction processes used in either oil sands surface mining or in situ operations. For example, but not meaning to be limiting, OSPW can be from obtained from tailings settling basins (fresh water separated from extraction tailings) or from reclamation components (aged OSPW) such as end-pit lakes, sand dyke seepage, etc. However, it is understood that the present invention can be used to treat any water source that has a substantial amount of dissolved organics, such as naphthenic acids and hydrocarbons, for example, which could be present in ground water or produced in other oil and gas operations.

As used herein, "petroleum coke" is a carbonaceous solid delivered from oil refinery coker units or other cracking processes. Coking processes include coking, fluid coking, flexicoking and delayed coking. Fluid coke produced in a fluid coking operation is one example of a petroleum coke useful in the present invention. A typical fluid coke comprises particles ranging in size from 44 to 825 microns in diameter and having a median diameter ($d_{50}$) size of 156 µm in diameter with an onion-like layered structure (Chung, K. H., L. C. G. Janke, R. Dureau, E. Furimsky. 1996. Leachability of cokes from Syncrude stockpiles. *ES &T* (3): 50-53). It is understood, however, that agglomeration of the smaller coke particles can sometimes occur, thereby creating much larger particles (i.e., ten times larger). This is common in fluid coking processes and is related to coker reactor operation. Preferably, hot fresh fluid coke is used, which has been removed directly from the coker burner of the coking operation.

Another example of a petroleum coke useful in the present invention is delayed coke produced from delayed coking operations. However, delayed coke has different physical properties including being produced in the form of larger lumps. Thus, when delayed coke is used in the present invention, the lumps of coke are preferably first pulverized to give a fine powder having an average particle size comparable to fluid coke.

As used herein, "pH-lowering agent" means any agent that is capable of either delivering hydrogen ions (a traditional acid) or of inducing higher hydrogen ion content in an environment (for example, carbon dioxide ($CO_2$)). Examples of pH-lowering agents that may be useful in the present invention are strong acids such as hydrochloric acid, nitric acid, sulfuric acid, hydrobromic acid, hydroiodic acid and perchloric acid. Carbon dioxide is another example of a pH-lowering agent which may be useful in the present invention. Dissolved $CO_2$ in water will produce carbonic acid, which is a weak acid. It is understood that other weak acids may also be useful in the present invention.

In one embodiment, the petroleum coke is hot fresh fluid coke produced during fluid coking, where coke is produced at high enough rates such that the concentration of the coke in the resulting coke/water slurry can be expected to range from about 10% to about >40% by weight.

In one embodiment, carbon dioxide is added in an amount sufficient to reduce the pH of the water containing dissolved organics to less than 7. For example, generally, untreated OSPW will have an alkaline pH in the range of about 7.5 to about 8.5, typically around 7.9. In one embodiment, carbon dioxide is added in an amount sufficient to reduce the pH of the OSPW to less than 6. In another embodiment, carbon dioxide is added in an amount sufficient to reduce the pH of the OSPW to between about 5 to about 7.

As used herein, a "carbon adsorption reactor" means any vessel known in the art which promotes carbon adsorption of dissolved organic contaminants. For example, a pipeline of sufficient length to provide adequate mixing and residence time can be a suitable reactor for carbon adsorption. In another embodiment, the carbon adsorption reactor of the present invention can be any stirred tank reactor known in the art, such as a continuous flow stirred tank reactor.

The present invention is particularly effective in reducing the concentration of extractable organic acids including the class of compounds referred to as naphthenic acids (NA).

The process for treating water containing dissolved organics may further comprise the step of separating the petroleum coke from the treated water. One embodiment takes advantage of the rapid settling characteristics of the coke in the transport slurries. Thus, gravity settling and collection of release waters, or design of deposit cells with bottom drainage will produce treated water with significantly reduced concentrations of dissolved organics such as NAs.

Passive separation methods that use open cells have the added benefit of reducing suspended solids concentrations by allowing the water to percolate through a bed or deposit of petroleum coke, further improving this aspect of water quality.

Another embodiment involves more active treatments to reduce solid concentrations in the treated waters, which include filtration or ultrafiltration using filtration membranes such as ZeeWeed™ ultrafiltration membranes. Once the treated water has been separated from the petroleum coke, the treated water can be recycled for operational purposes or returned to the environment, either directly or after a further treatment.

In a preferred embodiment, the treated water that is not recycled for operation needs but is being returned into the environment may be further treated using advanced oxidation methods such as aeration, ozonation, biological reactors such as engineered or natural aquatic systems, or membrane methods such as nanofiltration and reverse osmosis. These methods would further remove remaining dissolved organics, specifically the acid extractable organics which include naphthenic acids.

BRIEF DESCRIPTION OF THE DRAWINGS

The present invention, both as to its organization and manner of operation, may best be understood by reference to the following descriptions, and the accompanying drawings of various embodiments wherein like reference numerals are used throughout the several views, and in which.

DESCRIPTION OF THE PREFERRED EMBODIMENTS

The detailed description set forth below in connection with the appended drawings is intended as a description of various embodiments of the present invention and is not intended to represent the only embodiments contemplated by the applicant. The detailed description includes specific details for the purpose of providing a comprehensive understanding of the present invention. However, it will be apparent to those skilled in the art that the present invention may be practiced without these specific details.

Figure 1:
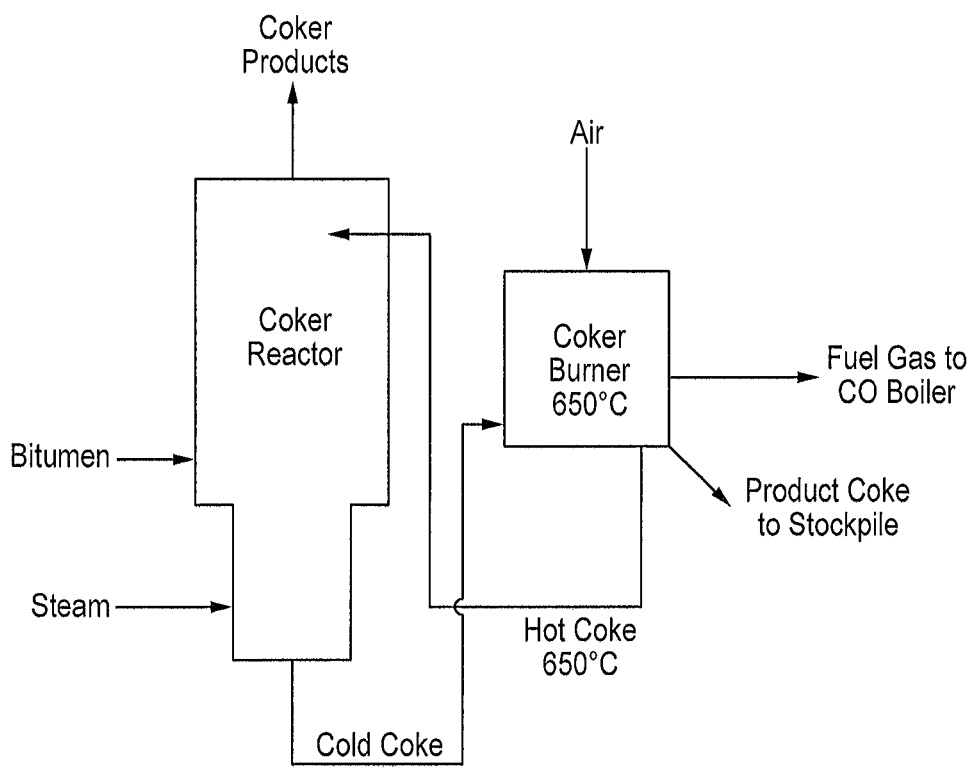
FIG. 1 is a simplified schematic of a known fluid coking circuit.

A fluid coking operation is illustrated in FIG. 1. It involves a fluidized bed coker reactor working in tandem with a fluidized bed coke burner. In the reactor, incoming feed oil (bitumen or residuum) contacts a fluidized bed of hot coke particles and heat is transferred from the coke particles to the oil. The reactor is conventionally operated at a temperature of about 530° C. Hot coke entering the reactor is conventionally at a temperature of about 600-650° C. to supply the heat requirement of the coker. "Cold" coke is continuously removed from the reactor and returned to the burner. The cold coke leaving the reactor is at a temperature of about 530° C. In the burner, the cold coke is partially combusted with air, to produce hot coke. Part of the hot coke is recycled to the reactor to provide the heat required. The balance of the hot coke is removed from the burner as product coke. The burner is conventionally operated at a temperature of 650° C. The burner temperature is controlled by the addition of air.

When petroleum coke exits the coker burner, it is either recycled back to the coker reactor (referred to as "hot coke") or stored in a dedicated area for future use (referred to as "product coke" or "fresh product coke"). The fresh product coke can be temporarily retained in coke silos or it can be used directly to form the coke/water slurry. Surprisingly, the fresh product coke was found to be effective in removing dissolved organics such as naphthenic acid from oil sands process water when a coke/OSPW slurry is formed and the slurry is subsequently pipelined.

Figure 2:
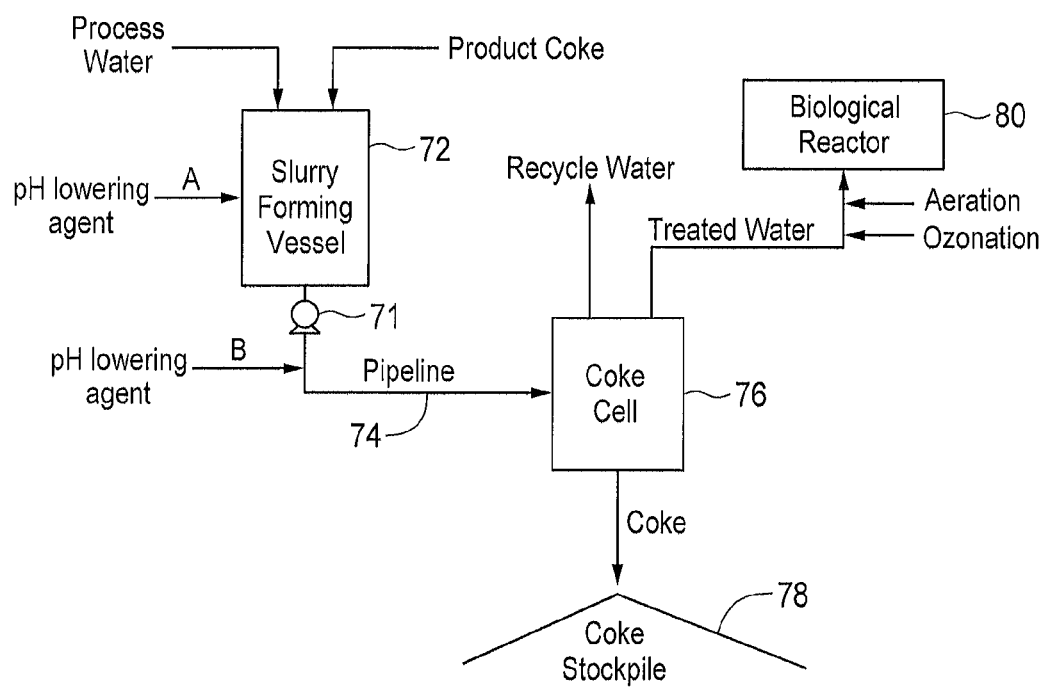
FIG. 2 is a simplified schematic of an embodiment of the water treatment process of the present invention.

FIG. 2 is a schematic of a water treatment process of the present invention. In this embodiment, oil sands process water (OSPW) obtained from an integrated oil sands mining, bitumen extraction and upgrading operation is first slurried with product coke in a vessel 72. Process water that is recycled at an oil sands integrated mining, extraction, upgrading operation may originate from tailings (i.e., produced during the extraction process) and various wastewater streams from all process areas including, for example, the Oily Water Sewer (OWS) and sour water treating units in Upgrading. Additional blow-downs from water treatment plants and utility boilers, surface water run-off and mine depressurization (Dp) water also contribute to "process water" make-up. Routinely, process water present as the "free" water for recycle in the settling basins from integrated open pit mining, extraction and upgrading oil sands operations will contain elevated dissolved organic carbon content (50-70 mgC/L), of which naphthenic acids are the dominant constituent (concentrations range from 50-80 mg/L). Typically, the coke/water slurry is formed such that the coke concentration averages between about 20 to about 30% by wt. However, coke concentrations can range between about 10% by wt to about 40% by wt or higher.

During the formation of the coke/water slurry in, for example, a slurry forming vessel 72, a pH-lowering agent (A) such as an acid or carbon dioxide can be added to the vessel 72 to form a treated coke/water slurry. Treatment with a pH-lowering agent such as an acid or carbon dioxide reduces the pH of the OSPW to less than 7, generally between about 5 and 7, preferably between about 5 and 6. Without being bound to theory, it is believed that the addition of a pH-lowering agent will lower the pH of the water to be treated and favor the protonated form of naphthenic acids (i.e., $NAH_{(aq)}$) rather than the ionic forms (i.e., $NA^-_{(aq)} + H^+_{(aq)}$). It is believed that the coke reacts better with $NAH_{(aq)}$ than $NA^-_{(aq)}$. The protonated forms of naphthenic acids have lower water solubilities and better adsorption properties and react better with the coke. In the alternative, or in addition, a pH-lowering agent (B) can be added to the coke/water slurry after the slurry exits the slurry forming vessel 72 to form treated coke/water slurry. Optionally, the pH-lowering agent can be added at the end of the pipeline (e.g., at a coke cell).

The treated coke/water slurry is then pumped through a pipeline 74 which acts as a plug-flow reaction vessel using a slurry pump 71 where the adsorption of dissolved organics by the petroleum coke primarily occurs. The use of a pipeline will not only result in adsorption of dissolved organics, but will also allow the product coke to be transported to a suitable area for stockpiling for future use. The pipeline length will vary; however, routinely the pipeline is approximately 5 km or more in length to give the slurry sufficient residence time (>20 minutes) for the adsorption process to occur. As previously mentioned, instead of a pipeline as the carbon adsorption reactor, any stirred vessel can be used as a carbon adsorption reactor, where adsorption of the dissolved organics to the petroleum coke can occur. When using a stirred vessel, the slurry may be formed directly in the vessel, eliminating the need for a slurry-forming vessel.

The petroleum coke can then be separated from the treated water using any number of separation techniques or devices known in the art. For example, as previously mentioned, the petroleum coke may be separated from the treated water by proactive methods involving filters or in a more passive manner using sedimentation tanks or open pond fills, with either water release or underflow gravity filtration through coke and sand beds. Separation in FIG. 2 occurs in coke cell 76. The remaining petroleum coke can then be stored in stockpile 78 or other suitable storage devices, e.g., cells. Use of open pond fills has the added benefit of increasing the residence time of the slurry and therefore one can collect water that has been allowed to percolate through the bed of petroleum coke.

The treated water that has been separated from the petroleum coke can now be used as recycle water in further extraction/upgrading operations or it can be evaluated for suitability for release to the environment. Depending upon the initial dissolved organics concentration of the water, the treated water might require further treatment such as with advanced oxidation or bioremediation reactor 80. Thus, additional methods for degradation or bioremediation of the remaining organics such as NAs may be required prior to the release of treated water into the environment.

Figure 3:
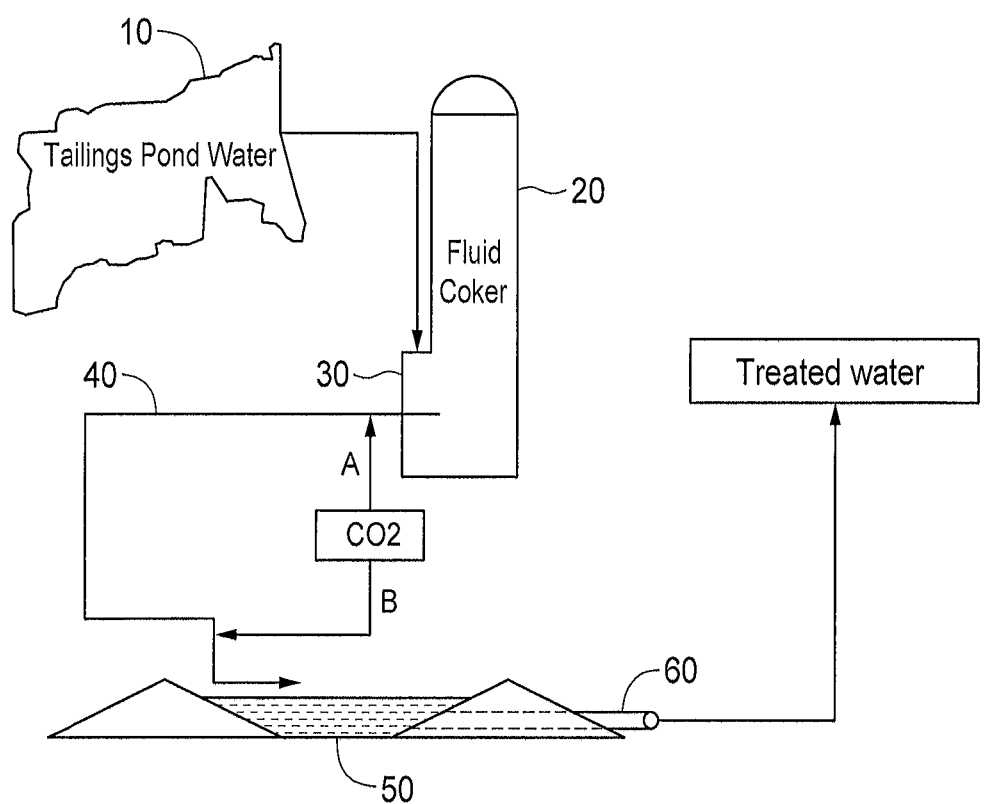
FIG. 3 is a simplified schematic of another embodiment of the water treatment process of the present invention.

FIG. 3 is a schematic of another embodiment of the water treatment process of the present invention. In this embodiment, process water obtained from a tailings pond 10 (tailings pond water) is first slurried with product coke produced in fluid coker 20 in a vessel 30 to a tailings pond water/coke slurry. Tailings pond water/coke slurry is then transported through pipeline 40. Carbon dioxide is added to the tailings pond water/coke slurry during transport of the tailings pond water/coke slurry through pipeline 40 to form a treated tailings pond water/coke slurry. Once again, treatment with carbon dioxide reduces the pH of the OSPW to less than 7, generally between about 5 and 7, preferably between about 5 and 6. Carbon dioxide may be added at the front end of pipeline 40 (A) to allow sufficient time for the NAs to react with the coke. In the alternative, or in addition, carbon dioxide can be added at or near the end of the pipeline 40 (B).

After addition of carbon dioxide, the treated tailings pond water/coke slurry continues to be pumped through pipeline 40 (a plug-flow reaction vessel) using a slurry pump where the adsorption of dissolved organics by the petroleum coke primarily occurs. The use of a pipeline will not only result in adsorption of dissolved organics, but will also allow the tailings pond water/coke slurry to be transported to a suitable area such as an open pond fill 50, where the treated water can separate from the coke. The treated water that is released can be removed by pipe 60 and used as recycle water in further extraction operations or it can be evaluated for suitability for release to the environment. Depending upon the initial dissolved organics concentration of the water, the treated water might require further treatment such as with advanced oxidation or bioremediation reactor. Thus, additional methods for degradation or bioremediation of the remaining organics such as NAs may be required prior to the release of treated water into the environment.

Figure 4:
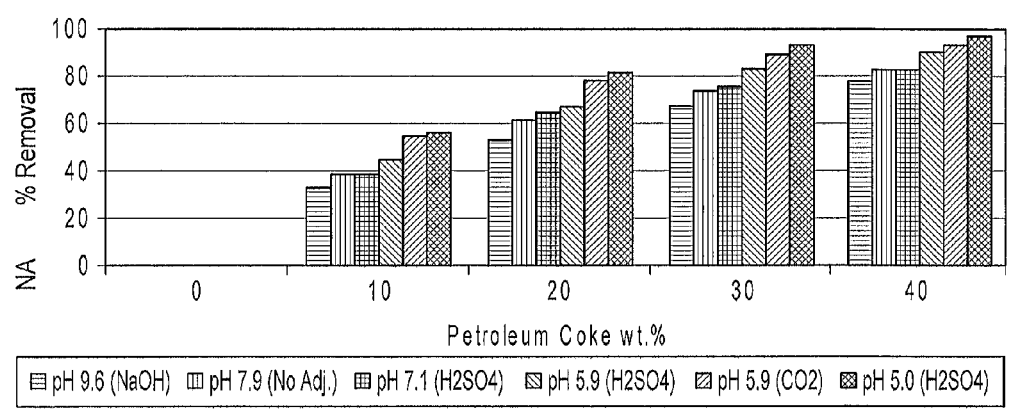
FIG. 4 is a graph showing the % naphthenic acids removed (based on NA measurement using the Fourier Transform Infrared method) versus the weight % of petroleum coke (fresh product coke) used with and without the addition of carbon dioxide.

FIG. 4 is a bar graph which shows the percentage of naphthenic acids removed from process water having an initial naphthenic acid concentration of about 78.4 mg/L. In this example, the process water that was used had an initial pH of about 7.90. The petroleum coke was obtained from a fluid coking operation as is routinely used in Fort McMurray, Alberta by the applicant. Slurries were formed using process water and increasing amounts of fluid coke (wt %) of 0 to 40 wt %. The process water/coke slurry was mixed at room temperature for a period of several minutes to >48 hours using a propeller stirrer for shorter times or a simple shaker for longer. The coke was then allowed to settle out by gravity and the water analyzed for naphthenic acids content as discussed below.

The pH of the process water was altered (i.e., increased or decreased) using either caustic (NaOH) or acid ($H_2SO_4$) to determine which form of naphthenic acids, i.e., protonated or ionized, would adsorb better on the coke. As can be seen in FIG. 4, naphthenic acid removal was more effective at lower pH than at alkaline pH. At about 20 wt % coke, a naphthenic acid reduction of about 65 wt % was observed at a pH of 5.9. When about 40 wt % coke was used, naphthenic acid reductions of greater than 90 wt % was observed at pH 5.9.

Once it was determined that adsorption was more effective at lower pH, carbon dioxide ($CO_2$) was also tested. The addition of $CO_2$ to the process water/coke slurry may be beneficial in ensuring that over-acidification does not occur, which may occur when using a strong oxidizing acid such as sulfuric acid ($H_2SO_4$). Since $CO_2$ forms a weak acid, there is less risk of over-acidification. Furthermore, $CO_2$ is readily available at oil sands facilities, as it is a by-product of hydrogen steam reforming for bitumen upgrading. Thus, in one embodiment, the present invention may use two by-products of bitumen upgrading, namely, $CO_2$ and petroleum coke, to help reclaim oil sand process water.

It can be seen from the bar graph in FIG. 4 that a significant amount of the naphthenic acids were removed when $CO_2$ was added to the slurry (hatched lines), even when using only 10% by mass of fluid coke. Between 30 and 40 wt % of coke, the percentage of naphthenic acids removed started to level out. Close to 95% of the naphthenic acids were removed when $CO_2$ was added to a slurry comprising 40 wt % coke.

Table 1 shows the naphthenic acid concentration (mg/L) of a process water sample having a pH of 7.9 with and without treatment with $CO_2$ when using various coke wt %.

TABLE 1

Naphthenic Acid Concentration (mg/L)

| Coke Wt % | pH = 4.96 ($H_2SO_4$) | pH = 5.85 ($CO_2$) | pH = 5.88 ($H_2SO_4$) | pH = 7.04 ($H_2SO_4$) | pH = 7.9 (No Adjustment) | pH = 9.58 (NaOH) |
|---|---|---|---|---|---|---|
| 0 | 70.7 | 65.5 | 76.8 | 76.1 | 78.4 | 76.2 |
| 10 | 31.0 | 29.8 | 42.9 | 46.9 | 48.5 | 51.6 |
| 20 | 13.1 | 14.9 | 25.6 | 27.1 | 31.3 | 36.0 |
| 30 | 5.2 | 7.2 | 13.1 | 18.7 | 20.4 | 17.3 |
| 40 | 2.3 | 4.8 | 7.9 | 13.4 | 13.9 | 16.7 |

The results indicate that lowering the process water pH increases the affinity for the NAs to be adsorbed by the petroleum coke. For example, at a coke dosage of 20 wt % and process water pH value of 9.6, concentrations of NAs decreased from 76.2 mg/L to 36 mg/L (53% removal). At the same petroleum coke dosage and a reduced process water pH of 5.0, NA concentrations decreased from 70.7 mg/L to 13.1 mg/L (81% removal). In general, the data indicates for the experimental pH range tested, and for a specified petroleum coke dose, adsorption improves as the process water pH is lowered (e.g., by adding $CO_2$). The effect on the adsorption of ionizable acids can be explained in terms of the process water pH value and the charge properties of the carbon surface (Yang et al 2004). Ionization constants ($pK_a$) for NAs have been reported to be between about 4.9 and 5.2; consequently, process water pH value will affect the degree of ionization of the NAs sorbate. As previously mentioned, when the pH value is decreased, NAs will tend to exist in their molecular form as indicated as follows:

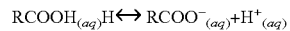

$$RCOOH_{(aq)} \rightleftharpoons RCOO^-_{(aq)} + H^+_{(aq)}$$

Thus, it can be seen that without $CO_2$ addition, even at 40 wt % coke, there still remained a significant amount of naphthenic acids (13.9 mg/L). However, with the addition of $CO_2$, at 40 wt % coke, the naphthenic acids were reduced to 4.8 mg/L.

The naphthenic acid concentrations were measured by the technique of methylene chloride extraction/Fourier Transform Infrared Spectroscopy (FTIR) as described in Syncrude Analytical Methods Manual, 4th Edition, 1995.

The scope of the claims should not be limited by the preferred embodiments set forth in the examples, but should be given the broadest interpretation consistent with the description as a whole.

What is claimed is:

1. A process for treating water containing naphthenic acids, comprising:
    removing petroleum coke from a coking operation to produce fresh product coke;
    using the fresh product coke to form a fresh product coke/water slurry by adding the water containing naphthenic acids to the fresh product coke;
    adding a pH-lowering agent to the fresh product coke/water slurry either during slurry formation or after slurry formation to form a treated fresh product coke/water slurry having a reduced pH;
    allowing the treated fresh product coke/water slurry having a reduced pH to mix for a sufficient time in a carbon adsorption reactor to allow a substantial portion of the naphthenic acids from the water to adsorb to the fresh product coke; and
    separating the treated water from the portion of fresh product coke having the naphthenic acids adsorbed thereon.

2. The process as claimed in claim 1, wherein the water containing naphthenic acids is oil sands process water from an oil sands extraction operation.

3. The process as claimed in claim 2, wherein the oil sands extraction operation is a surface mining operation.

4. The process as claimed in claim 2, wherein the oil sands process water is obtained from tailings settling basins.

5. The process as claimed in claim 1, wherein the coking operation is a fluid bed coking operation and the petroleum coke is fluid coke.

6. The process as claimed in claim 1, wherein the coking operation is a delayed coking operation and the petroleum coke is delayed coke, the process further comprising:
    pulverizing the delayed coke to a powder having an average particle size of about 200 µm prior to forming the fresh product coke/water slurry.

7. The process as claimed in claim 1, wherein the mixing step is substantially performed in a pipeline.

8. The process as claimed in claim 1, wherein mixing is substantially performed in a stirred tank reactor.

9. The process as claimed in claim 1, wherein the portion of fresh product coke in the fresh product coke/water slurry is between about 10 to about 50 percent by weight.

10. The process as claimed in claim 1, wherein the portion of fresh product coke in the fresh product coke/water slurry is between about 15 to about 30 percent by weight.

11. The process as claimed in claim 1, wherein the treated water is separated from the portion of fresh product coke by ultrafiltration, sand filtration, coke cells, sedimentation tanks, open pond fills, or combinations thereof.

12. The process as claimed in claim 1, further comprising:
    subjecting the separated treated water to biodegradation in a biological reactor or degradation by advanced oxidation methods.

13. The process as claimed in claim 1, wherein the water is separated from the portion of fresh product coke having the naphthenic acids adsorbed thereon by drainage in coke cells, further comprising:
    subjecting the separated water to membrane filtration methods comprising nanofiltration and reverse osmosis.

14. The process as claimed in claim 1, wherein the water is separated from the portion of fresh product coke having the naphthenic acids adsorbed thereon by membrane filtration, further comprising:
    subjecting the separated water to advanced oxidation methods.

15. The process as claimed in claim 1, wherein the pH-lowering agent is a strong acid.

16. The process as claimed in claim 15, wherein the strong acid is sulfuric acid.

17. The process as claimed in claim 1, wherein the pH-lowering agent is carbon dioxide.

18. The process as claimed in claim 1, wherein the pH of the treated fresh product coke/water slurry is about 7 or less.

19. The process as claimed in claim 1, wherein the pH of the treated fresh product coke/water slurry is between about 5 to about 7.

20. The process as claimed in claim 1, wherein the pH of the treated fresh product coke/water slurry is between about 5 to about 6.

21. A process for treating water containing naphthenic acids, comprising:
    removing petroleum coke from a coking operation to produce fresh product coke;
    mixing the water containing dissolved organic compounds with the fresh product coke to form a fresh product coke/water slurry having a fresh product coke concentration of at least about 10% by weight;
    adding carbon dioxide to the fresh product coke/water slurry to form a treated fresh product coke/water slurry;
    allowing the treated fresh product coke/water slurry to mix for a sufficient length of time so that the fresh product coke adsorbs a portion of the dissolved organic compounds from the water; and
    separating the water from the fresh product coke having the dissolved organic compounds adsorbed thereon.

22. The process as claimed in claim 21, wherein the water containing naphthenic acids is oil sands process water from an oil sands extraction operation.

23. The process as claimed in claim 22, wherein the oil sands extraction operation is a surface mining operation.

24. The process as claimed in claim 21, wherein the coking operation is a fluid bed coking operation and the petroleum coke is fluid coke.

25. The process as claimed in claim 21, wherein the mixing step is substantially performed in a pipeline.

26. The process as claimed in claim 21, wherein the mixing step is substantially performed in a stirred tank reactor.

27. The process as claimed in claim 21, wherein the fresh product coke in the fresh product coke/water slurry is between about 10 to about 50 percent by weight.

28. The process as claimed in claim 21, wherein the fresh product coke in the fresh product coke/water slurry is between about 15 to about 30 percent by weight.

29. The process as claimed in claim 21, wherein the water is separated from the fresh product coke having the naphthenic acids adsorbed thereon by membrane filtration, sand filtration, coke cells, sedimentation tanks, open pond fills, or combinations thereof.

30. The process as claimed in claim 29, wherein the separated water is subjected to further treatment selected from the group consisting of advanced oxidation methods, biological reactors, membrane filtration, reverse osmosis and combinations of advanced oxidation methods, biological reactors, membrane filtration and reverse osmosis.

* * * * *

UNITED STATES PATENT AND TRADEMARK OFFICE
CERTIFICATE OF CORRECTION

PATENT NO. : 9,890,060 B2  
APPLICATION NO. : 14/535026  
DATED : February 13, 2018  
INVENTOR(S) : Warren Zubot and Gail Buchanan It is certified that error appears in the above-identified patent and that said Letters Patent is hereby corrected as shown below:

On the Title Page

Assignee reads "SYNCRUD CANADA LTD., Fort McMurrary (CA)" and should read "SYNCRUDE CANADA LTD., Fort McMurray (CA)".

Signed and Sealed this
Nineteenth Day of June, 2018

Andrei Iancu
*Director of the United States Patent and Trademark Office*